May 20, 1969    H. BEYERSDORF ET AL    3,445,691
AXIAL AIR GAP DYNAMOELECTRIC MACHINE WITH COOLING
Filed Jan. 21, 1966                                          Sheet _1_ of 2
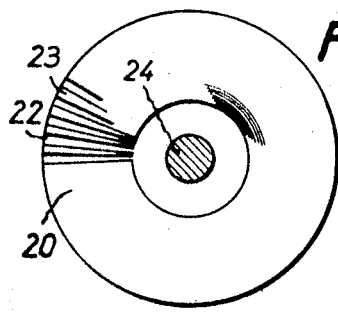
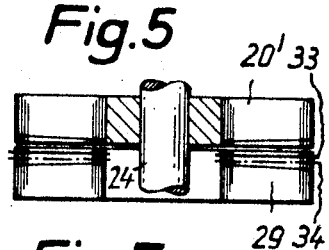
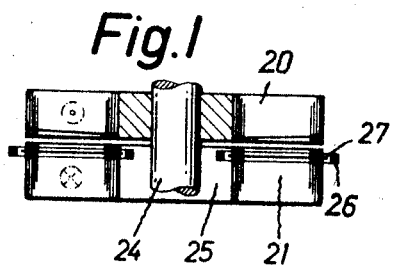
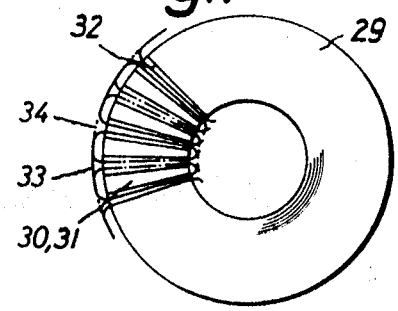
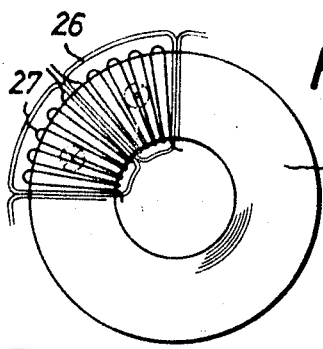
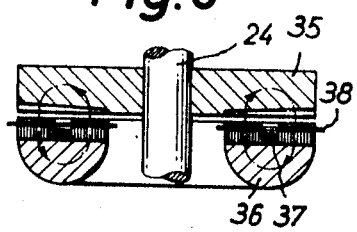
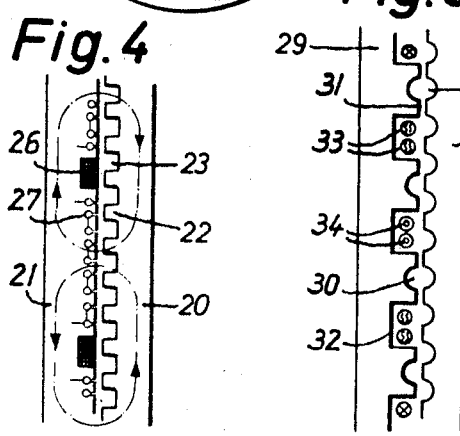
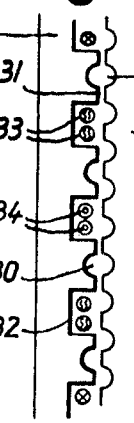
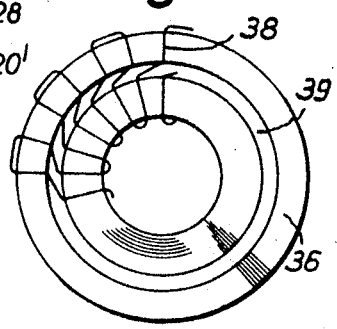
Inventors
Hartwig Beyersdorf
Gerhard Beving
By: Spencer & Kaye
Attorneys

United States Patent Office 3,445,691
Patented May 20, 1969

3,445,691
AXIAL AIR GAP DYNAMOELECTRIC MACHINE WITH COOLING
Hartwig Beyersdorf, Bremen-Arbergen, and Gerhard Bering, Bremen, Germany, assignors to Lloyd Dynamowerke G.m.b.H.
Filed Jan. 21, 1966, Ser. No. 522,264
Claims priority, application Germany, Jan. 21, 1965,
L 49,769
Int. Cl. H02k 9/08
U.S. Cl. 310—40     10 Claims

ABSTRACT OF THE DISCLOSURE

A rotary electric machine composed of a stator disc and a rotor disc, the discs being axially spaced from one another to define an air gap, one of the discs being provided with a plurality of spaced, radially extending teeth separated from one another by slots to cause the air gap between the two discs to present a magnetic conductance which varies cyclically about the axis of the machine, the other disc carrying an A.C. winding composed of a plurality of radial conductors, the machine further including a circular, homopolar excitation winding carried by one of the discs and dividing the disc into an inner portion and an outer portion, the portions being traversed by magnetic flux flowing in respectively opposite directions.

---

The present invention relates to the machine art, and particularly to the field of electrical generators or alternators.

Rotating electrical generators or alternators are generally constructed as medium frequency machines and include a stator provided with a D.C.-energized excitation winding and an A.C. output winding. Such machines also include a cylindrical rotor provided, on that cylindrical surface which faces the stator, with a plurality of longitudinally-extending slots and teeth which give the rotor the appearance of a gear. The number of slots and teeth depends upon the construction of the particular machine and is determined primarily by the speed with which the rotor is to rotate and the number of poles provided on the machine. The gear-like configuration of the cylindrical rotor surface creates an air gap having a cyclically-varying reluctance so that, when the machine is used as a generator for example, a magnetic flux variation, and hence an alternating voltage, is induced in the stator output winding.

The form of construction described above, which is practically the only one known to the prior art, requires relatively large iron magnetic flow paths and relatively expensive cooling arrangements.

Another class of electromagnetic machines, which is exemplified by electromagnetic slip clutches, is also known in the art. Such devices may operate according to the principle of a synchronous machine or of an asynchronous machine and include two relatively movable portions in the shape of discs. These devices are invariably constructed to have an air gap of constant length which presents an unvarying reluctance to magnetic flux.

It is an object of the present invention to eliminate the drawbacks which were inherent in the prior art generators.

It is a more specific object of the present invention to provide an improved source of electrical power utilizing a disc-shaped stator and rotor which are constructed to create an air gap having a varying magnetic reluctance.

Another object of the present invention is to provide a rotary electric machine of reduced size.

Still another object of the present invention is to provide a rotary electric machine having a highly efficient self-ventilating capability.

A still further object of the present invention is to provide a rotary electric machine having excitation and output windings which are entirely disposed on its stationary portion.

According to the present invention, these and other objects and advantages are achieved by the provision of a rotary electric machine including a stator and a rotor each in the form of a disc, with the rotor being mounted for rotation with respect to the stator and being spaced axially from the stator in consequence of which the rotor and stator form between themselves an air gap which extends axially between the rotor and the stator, and means for producing, in the air gap, flux paths of different magnetic conductance to produce predetermined flux changes.

Such a construction offers the advantage that the total magnetic material required for the magnetic flux paths is considerably less than that required by prior art generators of equal power generating capability, so that a machine constructed according to the present invention will be considerably lighter than comparable prior art machines.

Another great advantage offered by the construction according to the present invention resides in the fact that the length of the air gap between the stator and the rotor can be varied at will, even after the machine parts have been constructed and the machine has been assembled. This eliminates the problems which were often encountered in the prior art due to the fact that the rotor expanded as it was heated during operation and thus caused the length of the air gap to decrease, and often to become too small to permit efficient operation. Because of the manner in which prior art generators were constructed, it was impossible to vary the size of this air gap after the rotor and stator had been constructed.

Additional objects and advantages of the present invention will become apparent upon consideration of the following description when taken in conjunction with the accompanying drawings in which:

FIGURE 1 is an axial, cross-sectional view of one embodiment of the present invention.

FIGURE 2 is a plan view of the arrangement of FIGURE 1.

FIGURE 3 is a plan view of the stator of the device of FIGURE 1.

FIGURE 4 is a developed axial view of the arrangement of FIGURE 1.

FIGURE 5 is an axial, cross-sectional view of another embodiment of the present invention.

FIGURE 6 is a developed axial view of the device of FIGURE 5.

FIGURE 7 is a plan view of the stator of the device of FIGURE 5.

FIGURE 8 is an axial, cross-sectional view of still another embodiment of the present invention.

FIGURE 9 is a plan view of the stator of the device of FIGURE 8.

Figure 11:
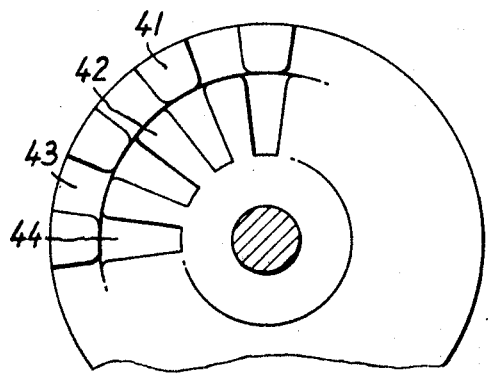
FIGURE 11 is a plan view of the rotor of the device of FIGURE 10.

Referring first to FIGURES 1 to 4 as a group, there is shown a first embodiment of the present invention constituting an electrical machine which operates as an A.C. generator having heteropolar excitation. As is shown in FIGURE 1, the generator generally includes a rotor 20 mounted for rotation with a shaft 24 and an annular stator 21 having substantially the same diameter as, and being axially aligned with, the rotor 20. The rotor is formed of a plated strip, or ribbon, which is wound into a laminated coil to form the annular rotor. The end face of the rotor 20 which faces the air gap between the stator and rotor is provided with a plurality of radially-extending teeth 22 and slots 23 distributed uniformly about the rotor axis, as is indicated in FIGURE 2. The shaft 24 passes through the central bore 25 of stator 21. For generator operation, one end of the shaft 24 may be operatively connected to a driving motor or other source of mechanical rotation.

The stator 21 is preferably plated in the same manner as the rotor 20 and is provided with two different windings, as may be best seen in FIGURE 3. One of these windings constitutes the heteropolar D.C. excitation winding 26 which is fed by a D.C. current souce (not shown), while the other winding constitutes the alternating current output winding 27 for the generator. FIGURE 4 shows a developed cross-sectional view taken through the air gap of the generator. The path of the magnetic flux generated by the excitation winding 26 is shown generally in FIGURES 1, 3 and 4 by dot-dash lines, the symbols used for this purpose in FIGURES 1 and 3 being in accordance with normal practice.

As is shown most clearly in FIGURE 4, the magnetic flux produced by the D.C. excitation winding 26 traverses the air gap and passes through both the stator 21 and the rotor 20. As the rotor 20 rotates with respect to the stator 21, the presence of the alternating teeth 22 and slot 23 on the rotor 20 causes the length of the air gap opposite each turn of the output winding 27 to vary in a cyclic manner. This variation in the air gap produces a cyclic variation in the flux density between each adjacent pair of radial conductors of winding 27 and hence induces an alternating voltage in this winding. It may be noted that this result is achieved without requiring the placement of any winding on the rotating element 20 so that the construction of machines according to the present invention is considerably easier than that of prior art machines. The number of turns of winding 27 is preferably made equal to the number of teeth 22 on rotor 20 or to a submultiple thereof.

Referring now to FIGURES 5 to 7, there is shown another embodiment of the present invention in which the rotor 20' differs from the rotor 20 of FIGURES 1 to 4 only in that it is provided with slots 28 having a semicircular cross section in place of the slots 23 being of rectangular cross section. The stator 29 is provided with slots 30 of semicircular cross section and teeth 31 which cooperate with the slot 28 and teeth of rotor 20' to produce the oscillating electromagnetic field. The stator 29 includes additional grooves 32 in which are disposed the alternating output winding 33 and the D.C.-energized excitation winding 34. The arrangement of these two windings in the stator slots is best shown in FIGURE 7, wherein the excitation winding 34 is shown in dot-dash lines and the output winding 33 is shown in solid lines.

A further embodiment of the present invention is shown in FIGURES 8 and 9 to include a homopolar D.C. excitation winding 37. This embodiment is provided with a rotor 35 made of a solid piece and a stator 36 which is also made of a solid piece and which serves as the return path for magnetic flux generated by excitation winding 37. Stator 36 is provided with a laminated portion on its surface adjacent the air gap between the rotor and stator, the laminated portion having a predetermined thickness and being constituted by substantially cylindrical laminations. The excitation winding 37 is disposed in the laminated portion of stator 36. The surface of rotor 35 adjacent the air gap is provided with uniformly-distributed slots and teeth having the form shown in FIGURE 2. The A.C. output winding 38 is arranged in the stator 36 in the manner shown in FIGURE 9. Since each of the slots and teeth in rotor 35 extends radially in a straight line, it is necessary that each conductor element of the winding 38 have its radially innermost portion disposed in one winding groove or bore and its radially outermost portion disposed in the next succeeding winding groove or bore, the transition between grooves taking place in the region where the conductor crosses the excitation winding 37. In this embodiment, the A.C. output winding is disposed in radial bores in the laminated portion of stator 36, the bores being interrupted by an annular groove 39 provided for receiving the excitation winding 37.

Figure 10:
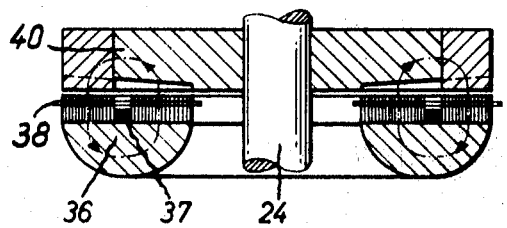
FIGURE 10 is an axial, cross-sectional view of yet another embodiment of the present invention.
Figure 12:
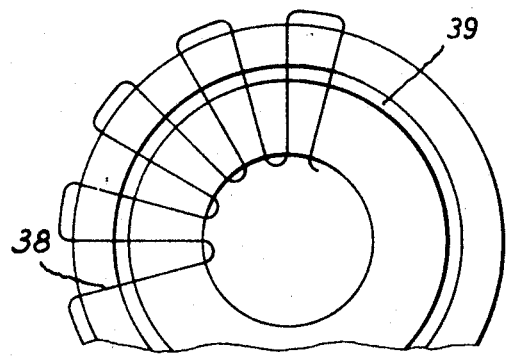
FIGURE 12 is a plan view of the stator of the device of FIGURE 10.

A modification of the device of FIGURES 8 and 9 is shown in FIGURES 10 to 12. In this embodiment, a rotor 40 is provided with two sets of slots and teeth, each of which sets is arranged in an annular band which is concentric with the axis of rotation of the rotor. In one band there is provided a succession of slots 44 and teeth 42 while the other band includes slots 43 and teeth 41 which are angularly displaced with respect to the first-mentioned band in such a way that each slot 43 is opposite a tooth 42 and each tooth 41 is opposite a slot 44. The circle dividing the two bands on rotor 40 is aligned with the D.C. excitation winding 37. This arrangement permits each conductor of the winding 38 to extend radially in a straight line across the face of stator 36.

The magnetic flux path produced by the current in excitation winding 37 is indicated by dot-dash loops in FIGURE 10.

It may be appreciated that the passage of each conductor of winding 38 from one groove to the next-suceeding groove in the device of FIGURES 8 and 9, or the provision of two sets of slots and teeth in the rotor 40 of the device of FIGURES 10 to 12, is necessary because the flux produced by winding 37 flows in one axial direction in the region enclosed by the excitation winding and in the opposite axial direction in the region outside thereof. Therefore, if one of the above-mentioned arrangements were not used, the voltage induced in one-half of each conductor of winding 38 would cancel out the voltage induced in the other half of the conductor and the total voltage induced in the output winding would equal zero.

According to another feature of the present invention, the excitation winding 37 could be disposed in the rotor of the machine, in which case it would not be necessary to provide an annular groove 37 in the stator. When such an arrangement is used, it is still desirable to either have each conductor of the output winding divided between two adjacent radial grooves or bores or to construct the rotor with two bands of slots and teeth, as shown in FIGURE 11.

Figure 13:
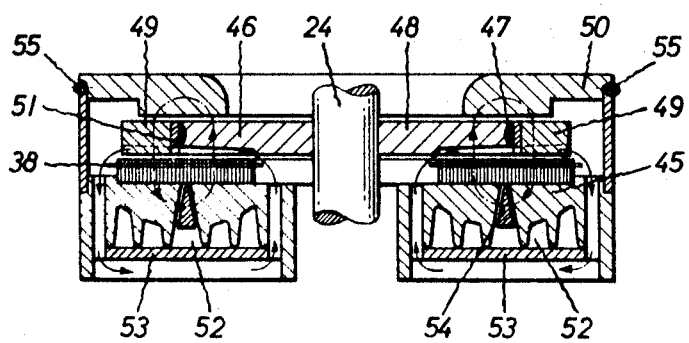
FIGURE 13 is an axial, cross-sectional view of a still further embodiment of the present invention.

In all of the embodiments thus far described, it is necessary to provide a rotor mounting which is capable of resisting the magnetic forces created by the current in the D.C. excitation winding, which forces tend to pull the stator and rotor toward each other. FIGURE 13 illustrates one embodiment of a device according to the present invention which eliminates this difficulty by causing the magnetic return path which previously existed in the rotor to be transferred to a stationary disc positioned on the other side of the rotor from the stator.

The device of FIGURE 13 is shown to include a stator 45 having, in the region adjacent the air gap, a laminated portion in which is disposed the alternating voltage winding 38. A rotor 46 carries the D.C. excitation winding 47 disposed between an inner disc portion 48 and an outer ring portion 49, which portions are magnetically isolated from one another by a separating layer 51 made of a nonmagnetic material. Each portion of rotor 46 is provided, at the end face adjacent stator 45, with a band of teeth and slots arranged in the manner illustrated in FIGURE 11. In order to present a magnetic return path for the flux produced by excitation winding 47, there is provided a stationary disc 50 which is aligned with the rotor 46 and which is separated therefrom by an auxiliary air gap whose length is of the same order of magnitude as the air gap between rotor 46 and stator 45. In order to provide a complete compensation for the tendency of the magnetic forces to pull rotor 46 towards stator 45, it is necessary that the area of the surface portion of disc 50 which is exposed to the magnetic flux be approximately equal to the area of the surfaces of the teeth of rotor 46 which are disposed parallel to stator 45. In the embodiment illustrated, the excitation winding 47 is disposed in a groove machined in the outer cylindrical wall of disc portion 48 of rotor 46.

In the embodiment of FIGURE 13, there is also provided a spiral recess 52 containing a cooling medium and sealed by a closing plate 53. The cooling medium is provided to cool an air stream emerging from the air gap of the machine, which stream is generated by the movement of the teeth and slots of rotor 46. In order to permit the cooling medium to efficiently cool this air stream, the stationary portion of the machine is provided with passages which permit the air stream to flow past the closing plate 53 in the manner indicated by the solid-line arrows. The illustrated device is also provided with an annular wedge 54 disposed in a groove in stator 45 and arranged to be axially movable in order to vary the permeance of the magnetical return path in the stator 45. There is also provided an adjusting element 55 supporting disc 50 and permitting this disc to be moved axially in order to adjust the air gap between itself and rotor 46.

While all of the illustrated embodiments of the present invention have been shown to include rotors having slots and teeth, which elements serve to produce a ventilating action at the same time as they create an air gap having a cyclically-varying reluctance, it should be understood that a device according to the present invention can also be constructed to have a smooth-face rotor in which spaced radial strips of a material having a lower permeance than the rotor itself are embedded.

In order to produce a varying magnetic field which is uniform in a radial direction, it has been found advantageous to cause the cross sections of the slots and the teeth to decrease progressively in a direction from the outer circumference of the rotor toward the rotor shaft while maintaining a constant ratio between the cross-sectional area of the slots and that of the teeth. In addition, as is true for all of the illustrated embodiments and as is clearly shown in FIGURES 1, 5, 8, 10 and 13, the slot bottoms are inclined with respect to a plane perpendicular to the machine axis while the tooth faces are parallel to such a plane, so that the depths of both the teeth and the slots decrease toward the machine axis.

It should also be noted that, although all of the illustrated embodiments of the present invention are provided with radially-extending slots and teeth, it is also possible, without departing from the spirit of the present invention, to have these teeth follow a curved path across the face of the rotor.

Depending on the number of poles which the machine is to have and the speed at which it is to rotate, it is also possible to construct the rotor and stator either wholly or partially from ferrite material instead of from the laminated steel used in constructing the preferred embodiments of the present invention. When a disc element is constructed of a plurality of spiral or cylindrical laminations, the sheets or plates from which the laminations are formed may be coated with a non-magnetic material in order to cause the laminations to be magnetically isolated from one another.

It may be appreciated that, in addition to the other advantages offered by the present invention, the provision of radial slots and teeth on one annular face of the rotor, as well as on the surface of the stator which faces the rotor, automatically produces a highly effective ventilation in machines constructed according to the present invention.

It may also be seen that, according to another advantageous feature of the present invention, a disc of magnetic material is disposed to the other side of the rotor from the stator in order to nullify the tendency of the magnetic excitation flux to pull the rotor and stator together.

Furthermore, in one novel form of construction according to the present invention, the D.C. excitation is provided by a heteropolar D.C.-energized winding having a plurality of relatively large coils, each of which coils constitutes one excitation pole of the machine.

The output A.C. winding can also be disposed on the stator, preferably in radially-extending winding grooves. This arrangement not only results in a favorable utilization of the available space, but also substantially facilitates construction because it permits the rotor disc to be entirely free of windings.

In another form of construction according to the present invention, the excitation is provided by a D.C. energized homopolar excitation winding disposed in a circular slot either in the stator or the rotor. When such a winding is used, it is necessary to either have each conductor divided between succeeding radial grooves in the stator, or to provide the rotor with two bands of slots and teeth, with the slots and teeth of one band being angularly offset with respect to those of the other band and with the circle dividing the two bands being disposed in alignment with the excitation winding.

It will be understood that the above description of the present invention is susceptible to various modifications, changes, and adaptations, and the same are intended to be comprehended within the meaning and range of equivalents of the appended claims.

It will further be understood, even where the illustrated embodiments of the present invention are referred to as generators, by inversion of the generator principle the machine embodying the invention may function as a motor. In this case, means for the facilitation of the start, such as an additional damper cage, or an auxiliary phase winding, may be provided.

What is claimed is:

1. A rotary electric machine comprising, in combination:

(a) means defining a stator in the form of a disc;
   (b) means defining a rotor in the form of a disc mounted for rotation with respect to said stator and spaced axially from said stator in consequence of which said rotor and said stator form between themselves an air gap which extends axially between said rotor and said stator;
   (c) means composed of a plurality of spaced teeth disposed around that face of one of said discs which is directed toward the other of said discs, the spaces between said teeth defining slots and each of said slots and teeth extending in a substantially radial direction, for producing in said air gap flux paths of different magnetic conductance to produce predetermined flux changes;
   (d) an A.C. winding composed of a plurality of radial conductors, said other of said discs being provided with a plurality of radial grooves in which said radial conductors are disposed; and
   (e) a homopolar excitation winding having a circular configuration and carried by one of said discs between the radial boundaries of said air gap; said disc carrying said excitation winding being composed, at the side thereof facing said air gap, of an inner disc portion and a concentric outer ring portion, which portions are separated from each other by said excitation winding so that the flux produced by said winding traverses said disc portion in one axial direction and traverses said ring portion in the opposite axial direction.

2. An arrangement as defined in claim 1 wherein the cross sections and depths of said slots and said teeth decrease progressively in a direction toward the axis of rotation of said rotor, with the ratio of the cross sections of said slots and said teeth remaining constant along their entire length.

3. An arrangement as defined in claim 1, wherein, each of said conductors has a first portion disposed in alignment with one of said teeth and a second portion disposed in alignment with one of said slots, the transition between said first and second portions occurring in the region where said conductor traverses said excitation winding.

4. An arrangement as defined in claim 3 wherein said stator has an annular groove formed in the end face thereof which is furthest removed from said air gap, said arrangement further comprising an iron ring having a cross section which is similar to that of said groove, which ring is movable in an axial direction for varying the permeance of said stator.

5. An arrangement as defined in claim 3 wherein said first portion of each said conductor is disposed in one of said radial grooves and said second portion thereof is disposed in the next succeeding one of said grooves.

6. An arrangement as defined in claim 3 wherein said one of said discs is provided with, two concentric bands of spaced teeth formed in the end face of the other one of said discs which faces said air gap, the spaces between the teeth of each said band defining slots, the slots and teeth of one of said bands being arranged so that each tooth thereof is radially aligned with a slot in the other one of said bands and each slot thereof is radially aligned with a tooth in said other one of said bands the circle defining the common boundary between said bands being aligned with said excitation winding.

7. An arrangement as defined in claim 3 wherein said rotor is composed of an inner disc portion and an outer ring portion and said portions are magnetically isolated from one another for preventing magnetic flux from passing directly from one of said portions to the other.

8. An arrangement as defined in claim 7 further comprising a stationary disc of magnetizable material disposed at the other side of said rotor from said stator and separated from said rotor by an auxiliary air gap which is substantially equal in length to said air gap between said stator and said rotor for providing a magnetic return path for the flux passing through said rotor.

9. An arrangement as defined in claim 8 wherein said excitation winding is disposed in a groove formed in the outer cylindrical surface of said rotor inner disc portion.

10. A rotary electric machine comprising, in combination:
  (a) means defining a stator in the form of a disc;
  (b) means defining a rotor in the form of a disc mounted for rotation with respect to said stator and spaced axially from said stator in consequence of which said rotor and said stator form between themselves an air gap which extends axially between said rotor and said stator;
  (c) said stator including a spiral recess, in the end face thereof which is furthest removed from said air gap, for the flow of a cooling medium; and
  (d) means for producing in said air gap flux paths of different magnetic conductance to produce predetermined flux changes.

References Cited

"Electrishe Maschinen," by Bödefeld and Sequenz, Springer Publishing House, Vienna (Austria), pp. 401–406, dated 1962.

WARREN E. RAY, *Primary Examiner.*

R. SKUDY, *Assistant Examiner.*

U.S. Cl. X.R.

310—57, 60, 90, 159, 179, 268